(12) United States Patent
Tan et al.

(10) Patent No.: US 12,535,710 B2
(45) Date of Patent: Jan. 27, 2026

(54) PIXEL STRUCTURE AND DISPLAY PANEL

(71) Applicant: Shenzhen China Star Optoelectronics Semiconductor Display Technology Co., Ltd., Guangdong (CN)

(72) Inventors: Ruifa Tan, Guangdong (CN); Tianhong Wang, Guangdong (CN); Xiaohui Yao, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 993 days.

(21) Appl. No.: 17/642,249

(22) PCT Filed: Feb. 25, 2022

(86) PCT No.: PCT/CN2022/077922
§ 371 (c)(1),
(2) Date: Aug. 24, 2023

(87) PCT Pub. No.: WO2023/155230
PCT Pub. Date: Aug. 24, 2023

(65) Prior Publication Data
US 2024/0111196 A1    Apr. 4, 2024

(30) Foreign Application Priority Data
Feb. 17, 2022   (CN) .......................... 202210147247.0

(51) Int. Cl.
*H10D 86/60*      (2025.01)
*G02F 1/1362*     (2006.01)
*H10D 86/40*      (2025.01)

(52) U.S. Cl.
CPC .. *G02F 1/136286* (2013.01); *G02F 1/136204* (2013.01); *H10D 86/441* (2025.01); *H10D 86/60* (2025.01)

(58) Field of Classification Search
CPC . G02F 1/136286; H10D 86/60; H10D 86/441
See application file for complete search history.

(56) References Cited

U.S. PATENT DOCUMENTS

2014/0111556 A1    4/2014  Chen
2021/0397055 A1*  12/2021  Yang ................ G02F 1/136263

FOREIGN PATENT DOCUMENTS

| CN | 102540597 | 7/2012 |
|----|-----------|--------|
| CN | 103018982 | 4/2013 |
| CN | 103135296 | 6/2013 |
| CN | 106773427 | 5/2017 |
| CN | 107942593 | 4/2018 |
| CN | 109188743 | 1/2019 |
| CN | 112086079 | 12/2020 |

(Continued)

*Primary Examiner* — Douglas M Menz

(57) ABSTRACT

The present application provides a pixel structure and a display panel. The pixel structure includes pixel units, data lines, and scan lines. The pixel unit includes a main pixel region and a sub-pixel region. Each data line includes a first data line section, a second data line section, and a third data line section. Each first data line section is arranged between the two main pixel regions of two adjacent pixel units. The second data line section and the third data line section are arranged in the two sub-pixel regions of adjacent two pixel units, respectively.

20 Claims, 4 Drawing Sheets

(56) References Cited

FOREIGN PATENT DOCUMENTS

| | | |
|---|---|---|
| CN | 112445038 | 3/2021 |
| KR | 10-2006-0114918 | 11/2006 |
| WO | WO 2017/210943 | 12/2017 |

\* cited by examiner

PIXEL STRUCTURE AND DISPLAY PANEL

RELATED APPLICATIONS

This application is a National Phase of PCT Patent Application No. PCT/CN2022/077922 having International filing date of Feb. 25, 2022, which claims the benefit of priority of Chinese Patent Application No. 202210147247.0 filed on Feb. 17, 2022. The contents of the above applications are all incorporated by reference as if fully set forth herein in their entirety.

FIELD AND BACKGROUND OF THE INVENTION

The present application relates to a field of display technology, and in particular, to a pixel structure and a display panel.

Due to the trend of panel products with narrow bezel and high resolution, conventional ultra-high-definition liquid crystal displays are designed such that chip-on-film technology is adopted for gate driver packaging, and driving signals of scan lines and data lines are on the same side, thus reducing widths of left and right sides of the LCD to achieve ultra-narrow bezels.

However, since there are parasitic capacitances between data lines and pixel units, signal changes of the data lines interfere with stability of signals in the pixel units. As ultra-narrow bezel products have increased resolution and smaller pixel units, the parasitic capacitances between the data lines and the pixel units cause a more obvious coupling effect on the pixel units, resulting in vertical crosstalk of a panel and affecting product quality of the panel. In addition, in the case of adopting the film-on-chip-on-film technology for the gate driver packaging, because there are lines perpendicular to a scan line in the pixel unit, the data lines on the left and right sides of the pixel unit have different distances to pixel unit electrodes. As a result, the parasitic capacitances between the data lines and the pixel unit electrodes are also different. Therefore, a common approach having opposite signals in the data lines on the left and right sides cannot completely offset the interference with the pixel units.

In light of the above, there is an urgent need to provide a pixel structure and a display panel to solve the display abnormality problem caused by vertical crosstalk of the pixel units as a result of the parasitic capacitances.

SUMMARY OF THE INVENTION

The present application provides a pixel structure and a display panel, which can solve display abnormality problems caused by vertical crosstalk in pixel units as a result of parasitic capacitances.

In one aspect, the present application provides a pixel structure, comprising:
a plurality of pixel units, a plurality of data lines, and a plurality of scan lines, wherein the pixel units are arranged in an array pattern, and each of the pixel units is arranged corresponding to one of the data lines;
wherein each of the pixel units comprises a main pixel region and a sub-pixel region;
wherein the scan lines are arranged between the main pixel regions and the sub-pixel regions;
wherein each of the data lines comprises a first data line section, a second data line section, and a third data line section, the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units;
wherein in each of the data lines, one ends of the second data line section and the third data line section are electrically connected to one end of the first data line section, and another end of the second data line section is electrically connected to another end of the third data line section; and
wherein the pixel structure further comprises a short-circuit detection module, and a metal layer where the data lines are located is electrically connected to a plurality of a plurality of pins of the short-circuit detection module.

Optionally, in some embodiments of the present application, each of the first data line sections is located on a center line between two adjacent pixel units, and each second data line section and the third data line section located on the adjacent pixel unit are left-right symmetrical with respect to the corresponding first data line section.

Optionally, in some embodiments of the present application, the second data line section and the third data line section located on a same one of the pixel units are left-right symmetrical with respect to a center line of this pixel unit.

Optionally, in some embodiments of the present application, in each data line, a sum of a width of the second data line section and a width of the third data line section is less than or equal to a width of the first data line section.

Optionally, in some embodiments of the present application, electrical signals in two adjacent data lines are of opposite polarity, and electrical signals in the first data line section, the second data line section and the third data line section on the same data line are of the same polarity.

Optionally, in some embodiments of the present application, in each data line, the second data line section and the third data line section are respectively located in opening regions of the sub-pixel regions of two adjacent pixel units.

Optionally, in some embodiments of the present application, in each data line, the second data line section comprises a first vertical portion, a first lateral portion, and a second lateral portion, the first vertical portion is perpendicular to the first lateral portion and the second lateral portion, one end of the first lateral portion is electrically connected to one end of the first vertical portion, and one end of the second lateral portion is electrically connected to another end of the first vertical portion;
wherein the third data line section comprises a second vertical portion, a third lateral portion, and a fourth lateral portion, the second vertical portion is perpendicular to the third lateral portion and the fourth lateral portion, one end of the third lateral portion is electrically connected to one end of the second vertical portion, and one end of the fourth lateral portion is electrically connected to another end of the second vertical portion; and
wherein another ends of the first lateral portion and the third lateral portion are electrically connected to one end of the first data line section, and another ends of the second lateral portion and the fourth lateral portion are electrically connected to another end of the first data line section.

Optionally, in some embodiments of the present application, in each data line, a length of the second data line section is greater than a length of the first data line section, and/or a length of the third data line section is greater than the length of the first data line section.

The present application further provides a pixel structure, including:

a plurality of pixel units, a plurality of data lines, and a plurality of scan lines, wherein the pixel units are arranged in an array pattern, and each of the pixel units is arranged corresponding to one of the data lines;

wherein each of the pixel units comprises a main pixel region and a sub-pixel region;

wherein the scan lines are arranged between the main pixel regions and the sub-pixel regions;

wherein each of the data lines comprises a first data line section, a second data line section, and a third data line section, and the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units; and wherein one ends of the second data line section and the third data line section are electrically connected to one end of the first data line section, and another end of the second data line section is electrically connected to another end of the third data line section.

Optionally, in some embodiments of the present application, each of the first data line sections is located on a center line between two adjacent pixel units, and each second data line section and the third data line section located on the adjacent pixel unit are left-right symmetrical with respect to the corresponding first data line section.

Optionally, in some embodiments of the present application, the second data line section and the third data line section located on a same one of the pixel units are left-right symmetrical with respect to a center line of this pixel unit.

Optionally, in some embodiments of the present application, in each data line, a sum of a width of each second data line section and a width of the third data line section is less than or equal to a width of the first data line section.

Optionally, in some embodiments of the present application, electrical signals in two adjacent data lines are of opposite polarity, and electrical signals in the first data line section, the second data line section and the third data line section on the same data line are of the same polarity.

Optionally, in some embodiments of the present application, in each data line, the second data line section and the third data line section are respectively located in opening regions of the sub-pixel regions of two adjacent pixel units.

Optionally, in some embodiments of the present application, in each data line, the second data line section comprises a first vertical portion, a first lateral portion, and a second lateral portion, the first vertical portion is perpendicular to the first lateral portion and the second lateral portion, one end of the first lateral portion is electrically connected to one end of the first vertical portion, and one end of the second lateral portion is electrically connected to another end of the first vertical portion;

wherein the third data line section comprises a second vertical portion, a third lateral portion, and a fourth lateral portion, the second vertical portion is perpendicular to the third lateral portion and the fourth lateral portion, one end of the third lateral portion is electrically connected to one end of the second vertical portion, and one end of the fourth lateral portion is electrically connected to another end of the second vertical portion; and wherein another ends of the first lateral portion and the third lateral portion are electrically connected to one end of the first data line section, and another ends of the second lateral portion and the fourth lateral portion are electrically connected to another end of the first data line section.

Optionally, in some embodiments of the present application, a length of the second data line section is greater than a length of the first data line section, and/or a length of the third data line section is greater than the length of the first data line section.

Optionally, in some embodiments of the present application, the pixel structure further comprises a short-circuit detection module, and a metal layer where the data lines are located is electrically connected to a plurality of pins of the short-circuit detection module.

In another aspect, the present application provides a display panel, comprising a substrate and a pixel structure, wherein the pixel structure is disposed on the substrate, and the pixel structure comprises:

a plurality of pixel units, a plurality of data lines, and a plurality of scan lines, wherein the pixel units are arranged in an array pattern, and each of the pixel units is arranged corresponding to one of the data lines;

wherein each of the pixel units comprises a main pixel region and a sub-pixel region;

wherein the scan lines are arranged between the main pixel regions and the sub-pixel regions;

wherein each of the data lines comprises a first data line section, a second data line section, and a third data line section, the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units; and wherein one ends of the second data line section and the third data line section are electrically connected to one end of the first data line section, and another end of the second data line section is electrically connected to another end of the third data line section.

Optionally, in some embodiments of the present application, each of the first data line sections is located on a center line between two adjacent pixel units, and each second data line section and the third data line section located on the adjacent pixel unit are left-right symmetrical with respect to the corresponding first data line section.

Optionally, in some embodiments of the present application, the second data line section and the third data line section located on a same one of the pixel units are left-right symmetrical with respect to a center line of the pixel unit.

Advantages of the Present Application

The present application provides a pixel structure and a display panel. The pixel structure comprises: a plurality of pixel units, a plurality of data lines, and a plurality of scan lines, wherein the pixel units are arranged in an array pattern, and each of the pixel units is arranged corresponding to one of the data lines. Each of the pixel units comprises a main pixel region and a sub-pixel region. The scan lines are arranged between the main pixel regions and the sub-pixel regions. Each of the data lines comprises a first data line section, a second data line section, and a third data line section, the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units. In each of the data lines, one ends of the second data line section and the third data line section are electrically connected to one end of the first data line section, and another end of the second data line section is electrically connected to another end of the third data line section. In the pixel structure of the present application, by changing the wiring configuration of the data lines, each pixel unit has the second data line section of the corresponding data line and the third data line section of the adjacent data line at the same time. Thus, a resistance and capacitance load of the data line is reduced, a charging rate of the pixel unit is increased, and a distance between the adjacent data lines is also shortened, thereby better offsetting a coupling effect on the pixel units resulting from parasitic capacitances between the data lines and the pixel units, which is beneficial to eliminate vertical crosstalk and improve the display performance.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF SPECIFIC EMBODIMENTS OF THE INVENTION

The technical solutions in the embodiments of the present application will be clearly and completely described below with reference to the accompanying drawings in the embodiments of the present application. Obviously, the described embodiments are only some of the embodiments of the present application, rather than all the embodiments. Based on the embodiments in the present application, all other embodiments obtained by those skilled in the art without creative work fall within the protection scope of the present application.

The present application provides a pixel structure and a display panel, which can solve the problem of display abnormality resulting from vertical crosstalk on pixel units caused by parasitic capacitance. Details are provided below. It should be noted that a description order of the following embodiments is not intended to limit a preferred order of the embodiments. In addition, in the present disclosure, the term "including" means "including but not limited to". The terms "first," "second," "third," etc. are used merely as labels to distinguish between different objects, rather than to describe a particular order.

Figure 1:
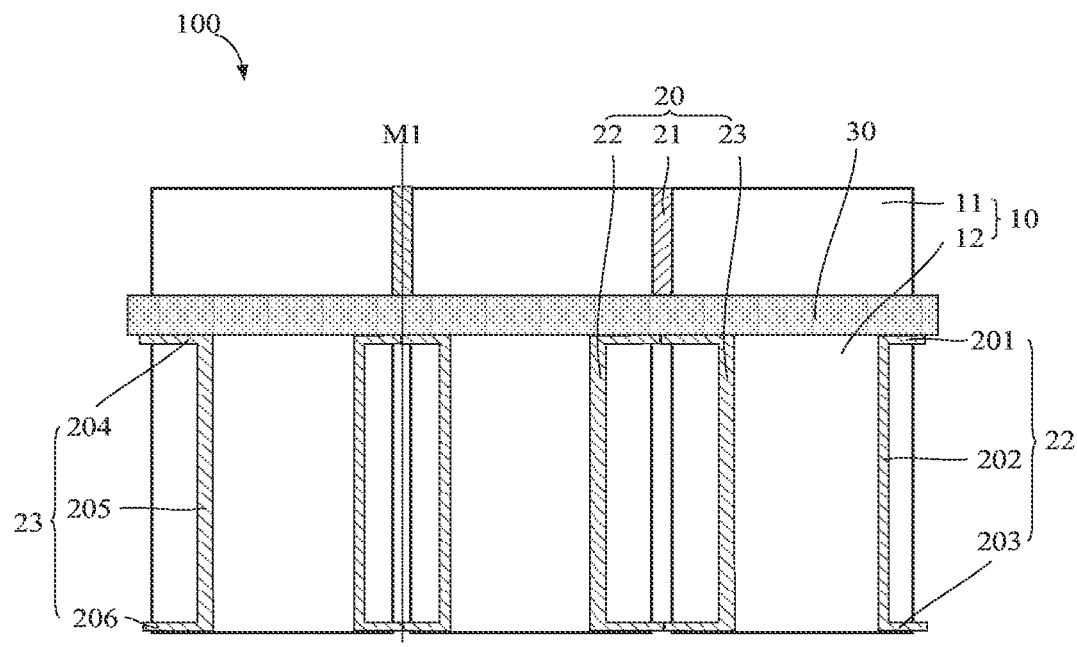
FIG. 1 is a first top view of a pixel structure according to one embodiment of the present application.
Figure 2:
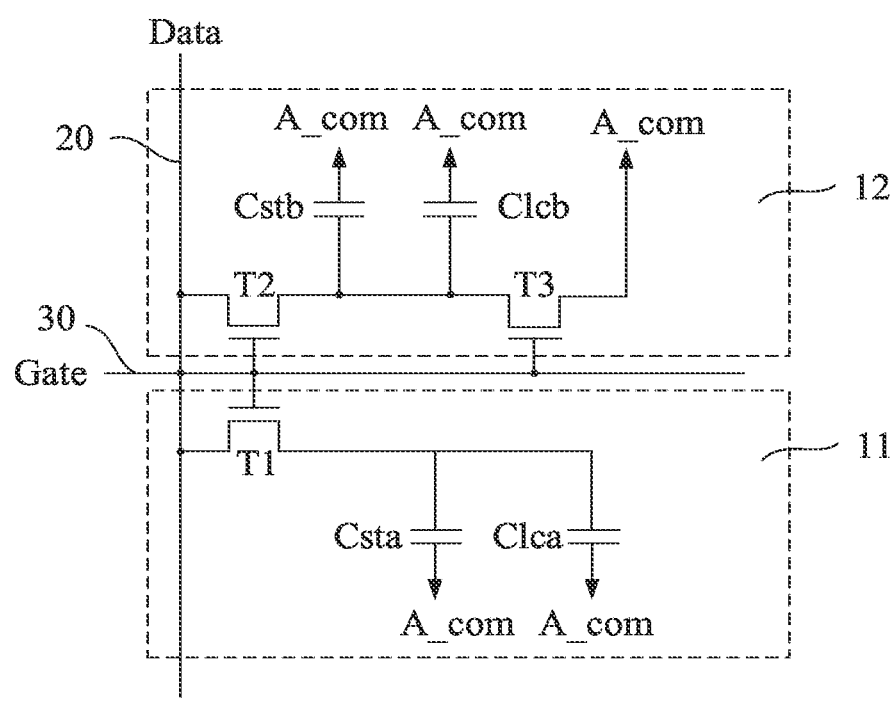
FIG. 2 is a circuit diagram of a pixel according to one embodiment of the present application.
Figure 3:
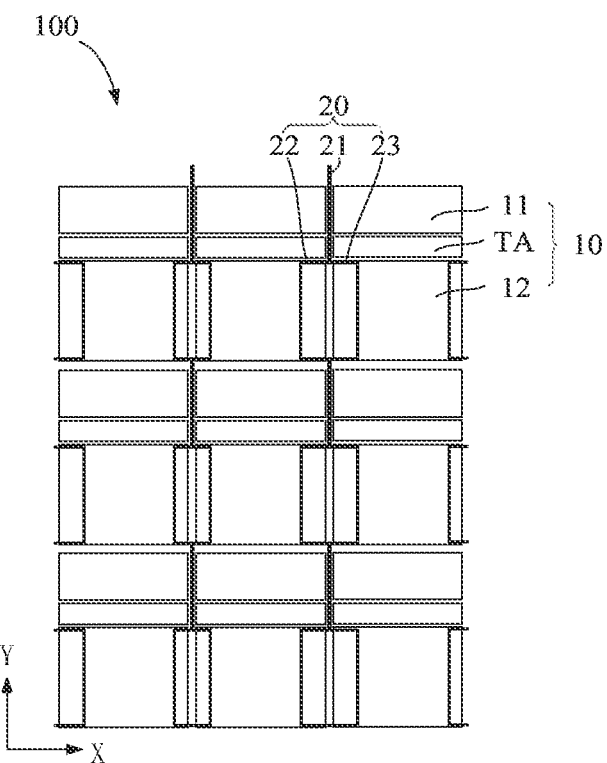
FIG. 3 is a first layout view of the pixel structure according to one embodiment of the present application.

Please refer to FIGS. 1 to 4. FIG. 1 is a first top view of a pixel structure according to one embodiment of the present application. FIG. 2 is a circuit diagram of a pixel according to one embodiment of the present application. FIG. 3 is a first layout view of a pixel structure according to one embodiment of the present application. As shown in FIG. 1, the present application provides a pixel structure 100, comprising: a plurality of pixel units 10, a plurality of data lines 20, and a plurality of scan lines 30. The pixel units 10 are arranged in an array pattern. Each pixel unit 10 is arranged corresponding to one data line 20. The pixel unit 10 comprises a main pixel region 11 and a sub-pixel region 12. The scan line 30 is located between the main pixel regions 11 and the sub-pixel regions 12. Each data line 20 comprises a first data line section 21, a second data line section 22, and a third data line section 23. Each first data line section 21 is located between the main pixel regions 11 of two adjacent pixel units 10 and extends in a direction toward the corresponding sub-pixel regions 12. The second data line section 22 and the third data line section 23 are respectively located on the sub-pixel regions 12 of two adjacent pixel units 10. One ends of the second data line section 22 and the third data line section 23 are electrically connected to one end of the first data line section 21, and another end of the second data line section 22 is electrically connected to another end of the third data line section 23.

In the pixel structure of the present application, each data line 20 comprises the first data line section 21, the second data line section 22, and the third data line section 23. The first data line section 21 is located between the main pixel regions of two adjacent pixel units 10 11 and extends in the direction toward the corresponding sub-pixel regions 12, the second data line section 22 and the third data line section 23 are respectively located on the sub-pixel regions 12 of two adjacent pixel units 10. One ends of the second data line section 22 and the third data line section 23 are electrically connected to one end of the first data line section 21. Another end of the second data line section 22 is electrically connected to another end of the third data line section 23. By changing the configuration of the data lines 20, each pixel unit 10 has the second data line section 22 of the data line 20 and the third data line section 23 of the adjacent data line 20 at the same time, thus reducing a resistance and capacitance load of the data line 20, increasing a charging rate of the pixel unit 10, and at the same time, and also reducing a distance between the adjacent data lines 20. This design better offsets coupling effects on the pixel units 10 resulting from parasitic capacitances between the data lines 20 and the pixel units 10, which is beneficial to eliminate vertical crosstalk and improve the display performance.

In the present application, the scan line 30 is located in a transistor circuit area TA. That is to say, the transistor circuit area TA is located between the main pixel regions 11 and the sub-pixel regions 12 of the pixel units 10 arranged along a first direction X. As shown in FIG. 2, the transistor circuit area TA corresponding to each pixel unit 10 is provided with a first transistor T1, a second transistor T2, and a third transistor T3. FIG. 2 is a pixel structure based on the scan line 30, the data line 20, and three thin film transistors according to one embodiment of the present application. The main pixel region 1111 of the pixel unit 10 comprises the first transistor T1, a first liquid crystal capacitor Clca, and a first storage capacitor Csta. A gate of the first transistor T1 is electrically connected to the scan line 30. A source and a drain of the first transistor T1 are electrically connected to the first data line section 21 of the data line 20 and the first liquid crystal capacitor Clca, respectively. The first liquid crystal capacitor Clca and the first storage capacitor Csta are electrically connected between the drain/source of the first transistor T1 and a common electrode A_com.

The sub-pixel region 12 of the pixel unit 10 comprises a second transistor T2, a third transistor T3, a second liquid crystal capacitor Clcb, and a second storage capacitor Cstb. A gate of the second transistor T2 is electrically connected to the scan line 30, and a source and a drain of the second transistor T2 are electrically connected to the second data line section 22/the third data line section 23 of the data line 20 and the second liquid crystal capacitor Clcb, respectively. A gate of the third transistor T3 is electrically connected to the scan line 30, and a source and a drain of the third transistor T3 are electrically connected to the drain/source of the second transistor T2 and the common electrode A_com, respectively.

In the present application, the first data line section 21 is located on a center line M1 between two adjacent pixel units 10. The second data line section 22 and the third data line section 23 located on the adjacent pixel unit 10 are left-right symmetrical with respect to the first data line section 21. Such a design makes the second data line section 22 and the third data line section 23 electrically connected to each other and arranged symmetrically, which is beneficial to reduce the resistance of the data line 20, reduce the resistance and capacitance load of the data line, and increase a charging rate of the pixel unit 10, thereby alleviating a problem of display crosstalk caused by the resistance of the data line 20 delaying a transmitted waveform signal. Meanwhile, the second data line section 22 and the third data line section 23 are disposed on the sub-pixel regions 12 of the pixel units 10, so an area of an opening region AA is increased, and an aperture ratio and light transmittance are increased.

In the present application, electrical signals in two adjacent data lines 20 are of opposite polarity, and the electrical signals in the first data line section 21, the second data line section 22, and the third data line section 23 of the same data line 20 are of the same polarity. Such configuration can offset coupling effects on the pixel unit 10 resulting from the parasitic capacitances between the adjacent two data lines 20 and the pixel unit 10. Accordingly, the problem of vertical crosstalk can be improved.

In the present application, the second data line section 22 comprises a first vertical portion 202, a first lateral portion 201 and a second lateral portion 203. The first vertical portion 202 is perpendicular to the first lateral portion 201 and the second lateral portion 203. One end of the first lateral portion 201 is electrically connected to one end of the first vertical portion 202, one end of the second lateral portion 203 is electrically connected to another end of the first vertical portion 202. The third data line section 23 comprises a second vertical portion 205, a third lateral portion 204, and a fourth lateral portion 206. The second vertical portion 205 is perpendicular to the third lateral portion 204 and the fourth lateral portion 206. One end of the third lateral portion 204 is electrically connected to one end of the second vertical portion 205, and one end of the fourth lateral portion 206 is electrically connected to another end of the second vertical portion 205. Another ends of the first lateral portion 201 and the third lateral portion 204 are electrically connected to one end of the first data line section 21, and another ends of the second lateral portion 203 and the fourth lateral portion 206 are electrically connected to another end of the first data line section 21. Specifically, the first lateral portion 201 is parallel to the second lateral portion 203, the first lateral portion 201 and the third lateral portion 204 are close to an upper boundary of the sub-pixel region 12, and the second lateral portion 203 and the fourth lateral portion 206 are close to a lower boundary of the sub-pixel region 12. An opening direction of a pattern formed by the vertical portion 202, the first lateral portion 201, and the second lateral portion 203 of the second data line section 22 is opposite to an opening direction of a pattern formed by the vertical portion 202, the first lateral portion 201, and the second lateral portion 203 of the third data line section 23.

In the present application, a sum of a width of the second data line section 22 and a width of the third data line section 23 is less than or equal to a width of the first data line section 21. Preferably, the sum of the width of the second data line section 22 and the width of the third data line section 23 is equal to or slightly less than the width of the first data line section 21. Such a design can reduce resistance without increasing a width of the data line 20. Therefore, an overall resistance value of the data line 20 is reduced, an area of the data line 20 can be further reduced, and a meta layer where the data line 20 is located less shields light. As a result, the data lines 20 less affects light-emitting brightness of the pixel units, and less material is required to fabricate the data line 20, so production costs can be reduced. It should be noted that the widths of the second data line section 22 and the third data line section 23 can be adjusted according to actual needs. Adjustments include, for example, getting a dynamic balance between minimizing vertical crosstalk and minimizing light shielding effects of the metal layer. However, the present application is not limited in this regard.

In the present application, a length of the second data line section 22 is greater than a length of the first data line section 21, and/or a length of the third data line section 23 is greater than a length of the first data line section 21. Also, an area of the sub-pixel region 12 is greater than an area of the main pixel region 11. Such a design can increase a proportion of the second data line section 22 and the third data line section 23 in the data line 20, so that the second data line section 22 and the third data line section 23 are much longer to better offset the coupling effect.

In the present application, the pixel structure further comprises a short-circuit detection module (not illustrated), and the metal layer where the data line 20 is located is electrically connected to the short-circuit detection module.

In the present application, as shown in FIG. 3, the pixel units 10 are arranged in an array pattern, and the data lines 20 are connected in series with a column of the pixel units 10 along a second direction Y. The scan line 30 is located between the main pixel regions 11 and the sub-pixel regions 12 of a row of the pixel units 10. The data line 20 comprises the first data line section 21, the second data line section 22, and the third data line section 23. The first data line section 21 is located between the main pixel regions 11 of two adjacent pixel units 10 and extends in a direction toward the sub-pixel regions 12. The second data line section 22 and the third data line section 23 are respectively located on the sub-pixel regions 12 of two adjacent pixel units 10. One ends of the second data line section 22 and the third data line section 23 are electrically connected to one end of the first data line section 21. Another end of the second data line section 22 is electrically connected to another end of the third data line section 23. Specifically, the first data line section 21 is located on the center line M1 between two adjacent pixel units 10. The second data line section 22 and the third data line section 23 located in the adjacent pixel unit 10 are left-right symmetrical with respect to the first data line section 21.

In the pixel structure of the present application, by changing the wiring configuration of the data lines 20, each pixel unit 10 has the second data line section 22 of the corresponding data line 20 and the third data line section 23 of the adjacent data line 20 at the same time. Thus, the resistance and capacitance load of the data line 20 is reduced, the charging rate of the pixel unit 10 is increased, and the distance between the adjacent data lines 20 is also shortened, thereby better offsetting the coupling effect on the pixel units 10 resulting from the parasitic capacitances between the data lines 20 and the pixel unit 10, which is beneficial to eliminate vertical crosstalk and improve the display performance.

Figure 4:
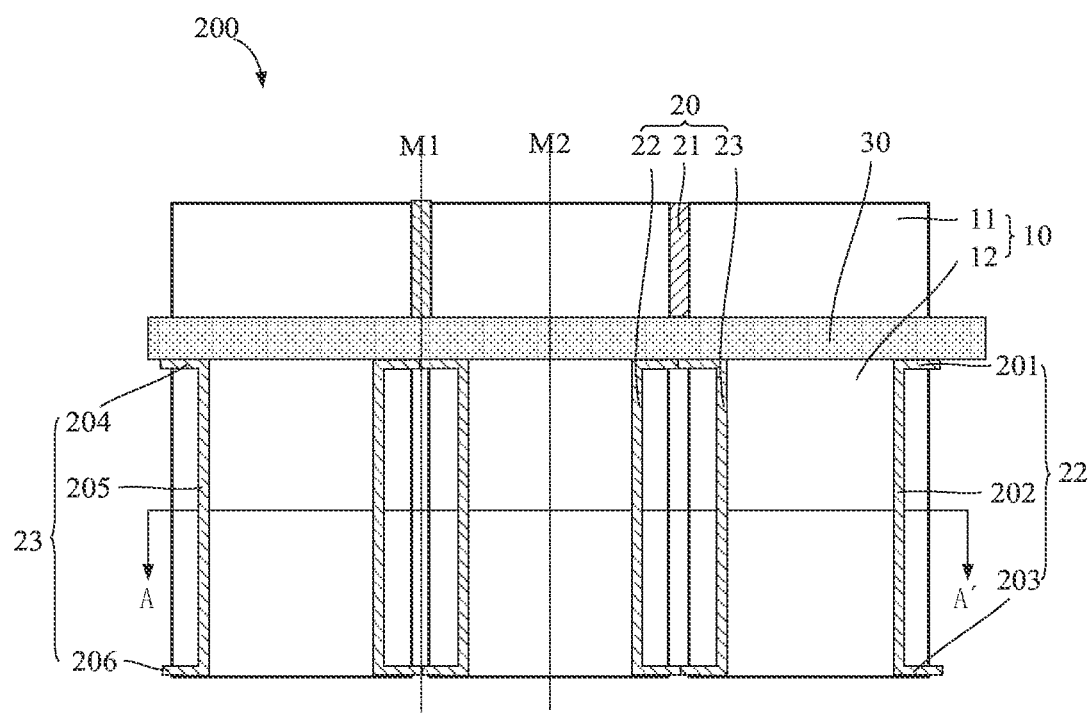
FIG. 4 is a second top view of the pixel structure according to one embodiment of the present application.
Figure 5:
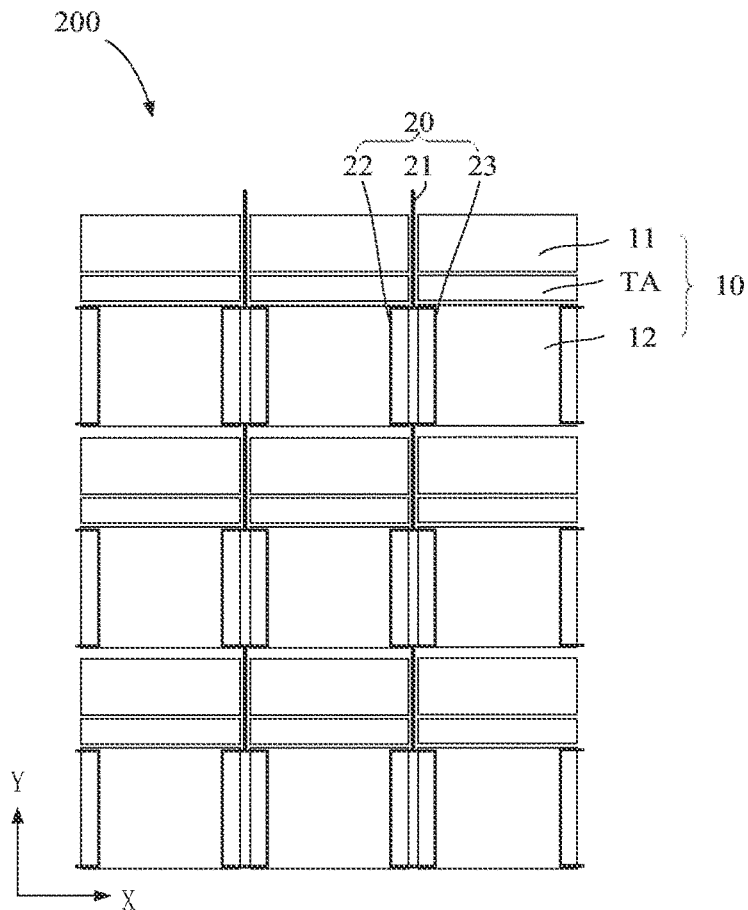
FIG. 5 is a second layout view of the pixel structure according to one embodiment of the present application.

Referring to FIG. 4 and FIG. 5 of the present application, FIG. 4 is a second top view of the pixel structure according to one embodiment of the present application, and FIG. 5 is a second layout view of the pixel structure according to one embodiment of the present application. As shown in FIG. 4, the present application provides a pixel structure 200. The pixel structure 200 is an improvement of the pixel structure 100. A difference between the pixel structure 200 and the pixel structure 100 is that the second data line section 22 and the third data line section 23 located on the same pixel unit 10 are left-right symmetrical with respect to a center line M2 of the pixel unit 10. The first data line section 21 is located on the center line M1 between two adjacent pixel units 10. The second data line section 22 and the third data line section 23 located in the adjacent pixel unit 10 are left-right symmetrical with respect to the first data line section 21. Such a structural design leads to a shorter distance between the adjacent data lines 20, which can better offset the coupling effect.

In the present application, the second data line section 22 comprises a first vertical portion 202, a first lateral portion 201, and a second lateral portion 203. The first vertical portion 202 is perpendicular to the first lateral portion 201 and the second lateral portion part 203. One end of the first lateral portion 201 is electrically connected to one end of the first vertical portion 202, one end of the second lateral portion 203 is electrically connected to another end of the first vertical portion 202. The third data line section 23 comprises a second vertical portion 205, a third lateral portion 204, and a fourth lateral portion 206. The second vertical portion 205 is perpendicular to the third lateral portion 204 and the fourth lateral portion 206. One end of the third lateral portion 204 is electrically connected to one end of the second vertical portion 205, and one end of the fourth lateral portion 206 is electrically connected to another end of the second vertical portion 205. Another ends of the first lateral portion 201 and the third lateral portion 204 are electrically connected to one end of the first data line section 21, and another ends of the second lateral portion 203 and the fourth lateral portion 206 are electrically connected to another end of the first data line section 21. Specifically, the first lateral portion 201 is parallel to the second lateral portion 203, the first lateral portion 201 and the third lateral portion 204 are close to an upper boundary of the sub-pixel region 12, and the second lateral portion 203 and the fourth lateral portion 206 are close to a lower boundary of the sub-pixel region 12. An opening direction of a pattern formed by the vertical portion 202, the first lateral portion 201, and the second lateral portion 203 of the second data line section 22 is opposite to an opening direction of a pattern formed by the vertical portion 202, the first lateral portion 201, and the second lateral portion 203 of the third data line section 23.

In the present application, as shown in FIG. 5, the pixel units 10 are arranged in an array pattern, and the data lines 20 are connected in series with a column of pixel units 10 along the second direction Y. The scan line 30 is located between the main pixel regions 11 and the sub-pixel regions 12 of a row of pixel units 10. The data line 20 comprises the first data line section 21, the second data line section 22, and the third data line section 23. The first data line section 21 is located between the main pixel regions 11 of two adjacent pixel units 10 and extends in the direction toward the sub-pixel region 12. The second data line section 22 and the third data line section 23 are respectively located on the sub-pixel regions 12 of two adjacent pixel units 10. One ends of the second data line section 22 and the third data line section 23 are electrically connected to one end of the first data line section 21, and another end of the second data line section 22 is electrically connected to another end of the third data line section 23. Specifically, the first data line section 21 is located on a center line M1 between two adjacent pixel units 10, and the second data line section 22 and the third data line section 23 located in the adjacent pixel unit 10 are left-right symmetrical with respect to the first data line section 21. The second data line section 22 and the third data line section 23 located on the same pixel unit 10 are left-right symmetrical with respect to a center line M2 of the pixel unit 10.

In the pixel structure of the present application, by changing the wiring configuration of the data line 20, each pixel unit 10 has both the second data line section 22 of the data line 20 and the third data line section 23 of the adjacent data line 20, thereby offsetting the coupling effect on the pixel unit 10 resulting from the parasitic capacitances between the data line 20 and the pixel unit 10, which is beneficial to eliminate vertical crosstalk and improve the display performance.

Figure 6:
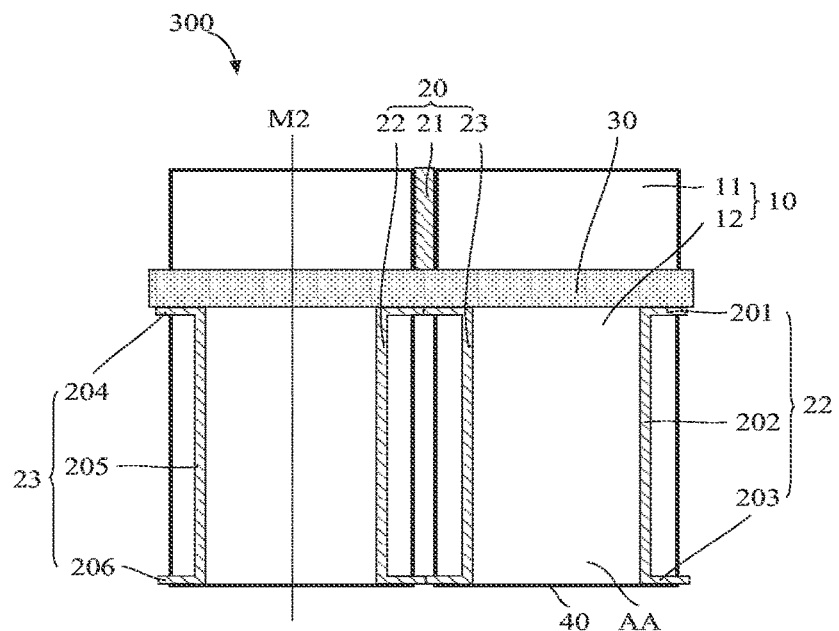
FIG. 6 is a third top view of the pixel structure according to one embodiment of the present application.

Please refer to FIG. 6, which is a third top view of the pixel structure according to one embodiment of the present application. As shown in FIG. 6, the present application provides a pixel structure 300. The pixel structure 300 is an improvement of the pixel structure 200. The pixel structure 300 and the pixel structure 200 are different in that: the second data line section 22 and the third data line section 23 are respectively located in the opening regions AA of the sub-pixel regions 12 of the two adjacent pixel units 10.

In the present application, the pixel structure further has the common electrode line 40, and a square area enclosed by the common electrode line 40 is the opening region AA of the pixel unit 10.

In this embodiment of the present application, the first data line section 21 is located on a center line M1 between two adjacent pixel units 10, and the second data line section 22 and the third data line section 23 located in the adjacent pixel unit 10 are left and right symmetrical with respect to the first data line section 21. The second data line section 22 and the third data line section 23 located on the same pixel unit 10 are left and right symmetrical with respect to a center line M2 of the pixel unit 10. Such a design makes the second data line section 22 and the third data line section 23 electrically connected to each other and arranged symmetrically, which is beneficial to reduce resistance of the data line 20, reduce a voltage drop caused by the resistance, and increase a charging rate of the pixel unit 10. At the same time, disposing the second data line section 22 and the third data line section 23 on the sub-pixel regions 12 of the pixel units 10 is beneficial to increase an area of the opening region AA and improve an aperture ratio and light transmittance.

In the present application, the electrical signals in two adjacent data lines 20 are of opposite polarity. The electrical signals in the first data line section 21, the second data line section 22, and the third data line section 23 of the same data line 20 are of the same polarity. Accordingly, such configuration offsets the coupling effect on the pixel unit 10 resulting from the parasitic capacitances between the adjacent two data lines 20 and the pixel unit 10, and finally improves the problem of vertical crosstalk.

In the present application, the second data line section 22 comprises a first vertical portion 202, a first lateral portion 201, and a second lateral portion 203. The first vertical portion 202 is perpendicular to the first lateral portion 201 and the second lateral portion 203. One end of the first lateral portion 201 is electrically connected to one end of the first vertical portion 202, one end of the second lateral portion 203 is electrically connected to another end of the first vertical portion 202. The third data line section 23 comprises a second vertical portion 205, a third lateral portion 204, and a fourth lateral portion 206. The second vertical portion 205 is perpendicular to the third lateral portion 204 and the fourth lateral portion 206. One end of the third lateral portion 204 is electrically connected to one end of the second vertical portion 205, and one end of the fourth lateral portion 206 is electrically connected to another end of the second vertical portion 205. Another ends of the first lateral portion 201 and the third lateral portion 204 are electrically connected to one end of the first data line section 21, and another ends of the second lateral portion 203 and the fourth lateral portion 206 are electrically connected to another end of the first data line section 21. Specifically, the first lateral portion 201 is parallel to the second lateral portion 203. The first lateral portion 201 and the third lateral portion 204 are close to an upper boundary of the sub-pixel region 12. The second lateral portion 203 and the fourth lateral portion 206 are close to a lower boundary of the sub-pixel region 12. An opening direction of a pattern formed by the vertical portion 202, the first lateral portion 201, and the second lateral portion 203 of the second data line section 22 is opposite to an opening direction of a pattern formed by the vertical portion 202, the first lateral portion 201, and the second lateral portion 203 of the third data line section 23.

In the present application, a sum of a width of the second data line section 22 and a width of the third data line section 23 is less than or equal to a width of the first data line section 21. It should be noted that the widths of the second data line section 22 and the third data line section 23 can be adjusted according to actual needs. Adjustments include, for example, getting a dynamic balance between minimizing vertical crosstalk and minimizing light shielding effects of the metal layer. However, the present application is not limited in this regard.

In the present application, a length of the second data line section 22 is greater than a length of the first data line section 21, and/or a length of the third data line section 23 is greater than a length of the first data line section 21.

In the present application, the pixel structure further comprises a short-circuit detection module (not illustrated), and a metal layer where the data line 20 is located is electrically connected to a plurality of pins of the short-circuit detection module.

By changing the wiring configuration of the data lines 20, each pixel unit 10 has both the second data line section 22 of the data line 20 and the third data line section 23 of the adjacent data line 20, a resistance and capacitive load of the data line 20 is reduced, a charging rate of the pixel unit 10 is increased, and at the same time, a distance between the adjacent data lines 20 is also decreased, thereby better offsetting the coupling effect on the pixel unit 10 resulting from the parasitic capacitance between the data lines 20 and the pixel unit 10. This is beneficial to eliminate vertical crosstalk and improve the display performance.

Figure 7:
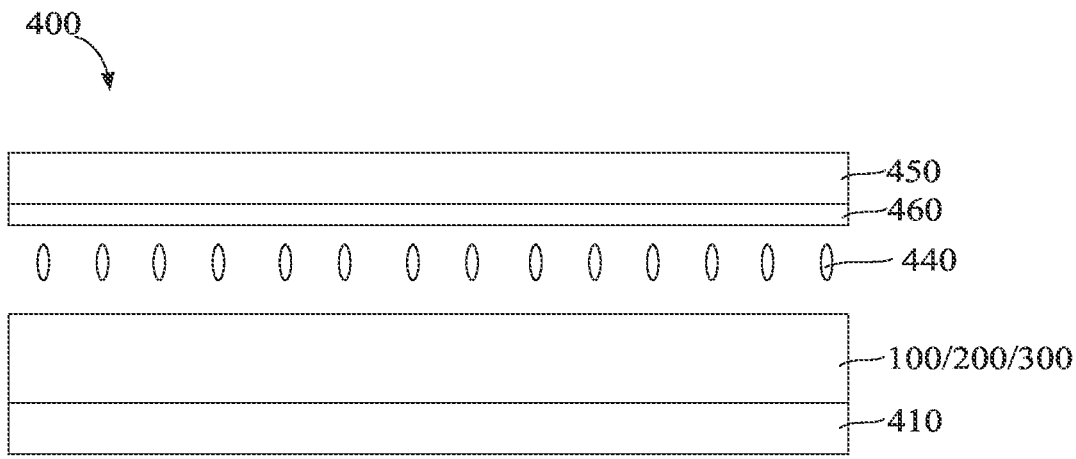
FIG. 7 is a schematic structural view of a display panel according to one embodiment of the present application.
Figure 8:
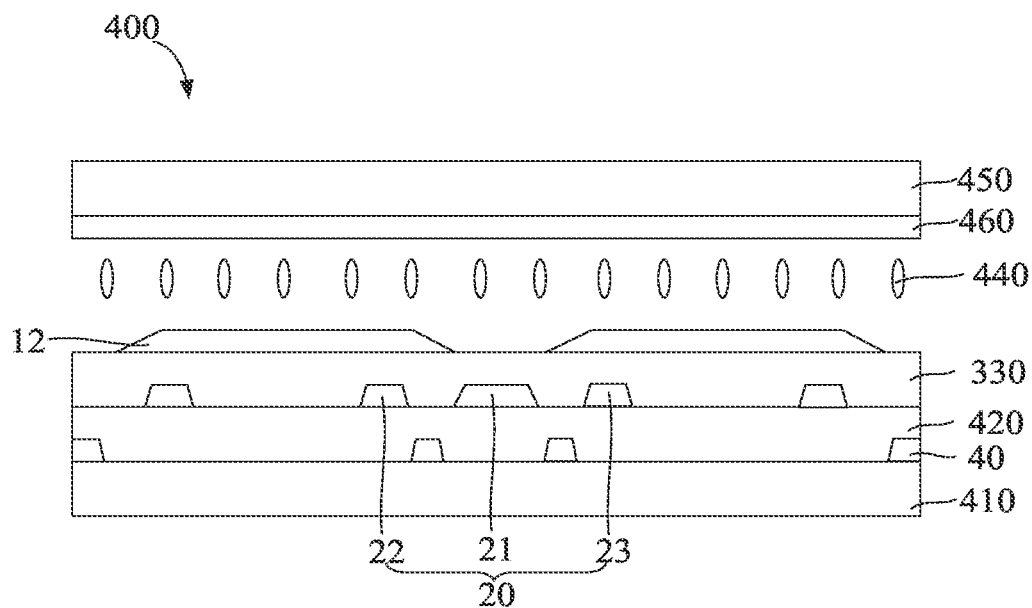
FIG. 8 is a partial cross-sectional view taken along line A-A' of FIG. 4.
100/200/300: pixel structure, 10: pixel unit, 11: main pixel region, 12: sub-pixel region, 20: data line, 201: first lateral portion, 202: first vertical portion, 203: second lateral portion, 204: third lateral portion, 205: second vertical portion, 206: fourth lateral portion, 21: first data line section, 22: second data line section, 23: third data line section, 30: scan line, 40: common electrode line, 400: display panel, 410: first substrate, 420: first insulating layer, 430: second insulating layer, 440: display medium, 450: second substrate, 460: common electrode layer.

Please refer to FIG. 7 and FIG. 8. FIG. 7 is a schematic structural view of a display panel according to one embodiment of the present application. FIG. 8 is a partial cross-sectional view taken along line A-A' of FIG. 4. As shown in FIG. 7, the present application provides a display panel 400, which comprises a substrate and the above-mentioned pixel structure, and the pixel structure is disposed on the substrate.

In the present application, as shown in FIG. 7, the substrate comprises a first substrate 410 and a second substrate 450. The display panel 400 comprises a pixel structure and a display medium 440 located between the first substrate 410 and the second substrate 450.

In the present application, a material of the substrate can be glass, quartz, organic polymer, or an opaque/reflective material (e.g., a conductive material, wafer, ceramic, or other applicable materials), or other suitable materials.

In the present application, the display medium 440 can comprise liquid crystal molecules, an electrophoretic display medium 440, or other suitable media. The display medium 440 in the following embodiment comprises liquid crystal molecules as an example, but is not limited thereto. Furthermore, the liquid crystal molecules in the present application are preferably, but not limited to, liquid crystal molecules that can be rotated or switched on and off by a horizontal electric field or liquid crystal molecules that can be rotated or switched on and off by a transverse electric field.

Specifically, as shown in FIG. 8, the display panel 400 comprises, a common electrode, a first insulating layer 420, a second data line section 22 and a third data line section 23 of the data line 20, a second insulating layer 430, and the sub-pixel region 12 of the pixel structure, which are sequentially arranged on the first substrate 410. A material of the first insulating layer 420/the second insulating layer 430 can be an inorganic material (e.g., silicon oxide, silicon nitride, silicon oxynitride, or a stacked layer of at least two of the above materials), an organic material, or a combination thereof. The display panel 400 further comprises a second substrate 450 and a common electrode layer 460 disposed on the second substrate 450.

The present application provides a pixel structure and a display panel. By changing the wiring configuration of the data lines 20, each pixel unit 10 has the second data line section 22 of the data line 20 and the third data line section of the adjacent data line 20 at the same time. This design reduces the resistance and capacitance load of the data line 20, increases the charging rate of the pixel unit 10, and at the same time, and decreases the distance between the adjacent data lines 20, thereby better offsetting the coupling effect on the pixel unit 10 resulting from the parasitic capacitances between the data lines 20 and the pixel unit 10, which is beneficial to eliminate vertical crosstalk and improve the display performance.

The display panel can be any product or device with display function, such as an electronic paper, a mobile phone, a tablet computer, a television, a monitor, a notebook computer, a digital photo frame, and a navigator.

The pixel structure and the display panel of the present application have been introduced in detail above. The working principles and embodiments of the present application are described with specific examples in the present disclosure. The above embodiments are only used for ease of understanding the present application. Those skilled in the art, according to the idea of the present application, can still modify or change the embodiments and the application range. In conclusion, the present disclosure should not be construed as a limit to the present application.

What is claimed is:

1. A pixel structure, comprising:
a plurality of pixel units, a plurality of data lines, and a plurality of scan lines, wherein the pixel units are arranged in an array pattern, and each of the pixel units is arranged corresponding to one of the data lines;
wherein each of the pixel units comprises a main pixel region and a sub-pixel region;
wherein the scan lines are arranged between the main pixel regions and the sub-pixel regions;
wherein each of the data lines comprises a first data line section, a second data line section, and a third data line section, the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units;
wherein in each of the data lines, one ends of the second data line section and the third data line section are electrically connected to one end of the first data line section, and another end of the second data line section is electrically connected to another end of the third data line section; and
wherein the pixel structure further comprises a short-circuit detection module, and a metal layer where the data lines are located is electrically connected to a plurality of a plurality of pins of the short-circuit detection module.

2. The pixel structure according to claim 1, wherein each of the first data line sections is located on a center line between two adjacent pixel units, and each second data line section and the third data line section located on the adjacent pixel unit are left-right symmetrical with respect to the corresponding first data line section.

3. The pixel structure according to claim 2, wherein the second data line section and the third data line section located on a same one of the pixel units are left-right symmetrical with respect to a center line of this pixel unit.

4. The pixel structure according to claim 3, wherein in each data line, a sum of a width of the second data line section and a width of the third data line section is less than or equal to a width of the first data line section.

5. The pixel structure according to claim 3, wherein electrical signals in two adjacent data lines are of opposite polarity, and electrical signals in the first data line section, the second data line section and the third data line section on the same data line are of the same polarity.

6. The pixel structure according to claim 3, wherein in each data line, the second data line section and the third data line section are respectively located in opening regions of the sub-pixel regions of two adjacent pixel units.

7. The pixel structure according to claim 1, wherein in each data line, the second data line section comprises a first vertical portion, a first lateral portion, and a second lateral portion, the first vertical portion is perpendicular to the first lateral portion and the second lateral portion, one end of the first lateral portion is electrically connected to one end of the first vertical portion, and one end of the second lateral portion is electrically connected to another end of the first vertical portion;
wherein the third data line section comprises a second vertical portion, a third lateral portion, and a fourth lateral portion, the second vertical portion is perpendicular to the third lateral portion and the fourth lateral portion, one end of the third lateral portion is electrically connected to one end of the second vertical portion, and one end of the fourth lateral portion is electrically connected to another end of the second vertical portion; and
wherein another ends of the first lateral portion and the third lateral portion are electrically connected to one end of the first data line section, and another ends of the second lateral portion and the fourth lateral portion are electrically connected to another end of the first data line section.

8. The pixel structure according to claim 7, wherein in each data line, a length of the second data line section is greater than a length of the first data line section, and/or a length of the third data line section is greater than the length of the first data line section.

9. A pixel structure, comprising:
a plurality of pixel units, a plurality of data lines, and a plurality of scan lines, wherein the pixel units are arranged in an array pattern, and each of the pixel units is arranged corresponding to one of the data lines;
wherein each of the pixel units comprises a main pixel region and a sub-pixel region;
wherein the scan lines are arranged between the main pixel regions and the sub-pixel regions;
wherein each of the data lines comprises a first data line section, a second data line section, and a third data line section, and the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units; and
wherein one ends of the second data line section and the third data line section are electrically connected to one end of the first data line section, and another end of the second data line section is electrically connected to another end of the third data line section.

10. The pixel structure according to claim 9, wherein each of the first data line sections is located on a center line between two adjacent pixel units, and each second data line section and the third data line section located on the adjacent pixel unit are left-right symmetrical with respect to the corresponding first data line section.

11. The pixel structure according to claim 10, wherein the second data line section and the third data line section located on a same one of the pixel units are left-right symmetrical with respect to a center line of this pixel unit.

12. The pixel structure according to claim 11, wherein in each data line, a sum of a width of each second data line section and a width of the third data line section is less than or equal to a width of the first data line section.

13. The pixel structure according to claim 11, wherein electrical signals in two adjacent data lines are of opposite polarity, and electrical signals in the first data line section, the second data line section and the third data line section on the same data line are of the same polarity.

14. The pixel structure according to claim 11, wherein in each data line, the second data line section and the third data line section are respectively located in opening regions of the sub-pixel regions of two adjacent pixel units.

15. The pixel structure according to claim 9, wherein in each data line, the second data line section comprises a first vertical portion, a first lateral portion, and a second lateral portion, the first vertical portion is perpendicular to the first lateral portion and the second lateral portion, one end of the first lateral portion is electrically connected to one end of the first vertical portion, and one end of the second lateral portion is electrically connected to another end of the first vertical portion;

wherein the third data line section comprises a second vertical portion, a third lateral portion, and a fourth lateral portion, the second vertical portion is perpendicular to the third lateral portion and the fourth lateral portion, one end of the third lateral portion is electrically connected to one end of the second vertical portion, and one end of the fourth lateral portion is electrically connected to another end of the second vertical portion; and wherein another ends of the first lateral portion and the third lateral portion are electrically connected to one end of the first data line section, and another ends of the second lateral portion and the fourth lateral portion are electrically connected to another end of the first data line section.

16. The pixel structure according to claim 15, wherein a length of the second data line section is greater than a length of the first data line section, and/or a length of the third data line section is greater than the length of the first data line section.

17. The pixel structure according to claim 9, wherein the pixel structure further comprises a short-circuit detection module, and a metal layer where the data lines are located is electrically connected to a plurality of pins of the short-circuit detection module.

18. A display panel, comprising a substrate and a pixel structure, wherein the pixel structure is disposed on the substrate, and the pixel structure comprises:

a plurality of pixel units, a plurality of data lines, and a plurality of scan lines, wherein the pixel units are arranged in an array pattern, and each of the pixel units is arranged corresponding to one of the data lines;

wherein each of the pixel units comprises a main pixel region and a sub-pixel region;

wherein the scan lines are arranged between the main pixel regions and the sub-pixel regions;

wherein each of the data lines comprises a first data line section, a second data line section, and a third data line section, the first data line section is disposed between the two main pixel regions of two adjacent pixel units and extends in a direction toward the corresponding sub-pixel regions, and the second data line section and the third data line section are respectively disposed on the sub-pixel regions of two adjacent pixel units; and wherein one ends of the second data line section and the third data line section are electrically connected to one end of the first data line section, and another end of the second data line section is electrically connected to another end of the third data line section.

19. The display panel according to claim 18, wherein each of the first data line sections is located on a center line between two adjacent pixel units, and each second data line section and the third data line section located on the adjacent pixel unit are left-right symmetrical with respect to the corresponding first data line section.

20. The pixel structure according to claim 19, wherein the second data line section and the third data line section located on a same one of the pixel units are left-right symmetrical with respect to a center line of the pixel unit.

* * * * *